3,146,255
PREPARATION OF MONOALKYL PHOSPHATES
Arthur K. Nelson, Chicago Heights, and Arthur Dock Fon Toy, Park Forest, Ill., assignors to Stauffer Chemical Company, New York, N.Y., a corporation of Delaware
No Drawing. Filed Sept. 12, 1962, Ser. No. 223,238
6 Claims. (Cl. 260—461)

This invention is directed to a novel process for the preparation of monoalkyl phosphates derived from primary alcohols, and the alkali metal salts thereof, in which the alkyl group contains 5 or more carbon atoms. The process is equally applicable to both branched and straight-chain alkyl groups.

The present-day literature on monoalkyl phosphates is often inaccurate due to the inappropriate use of the term "monoalkyl phosphates" when, in reality, what is meant is a mixture comprising monoalkyl-, dialkyl-, and, possibly, trialkyl phosphates. Today, monoalkyl phosphates are available in large commercial quantities only as components of such mixtures. Commonly used methods for the preparation of monoalkyl phosphates involve the simultaneous formation of dialkyl phosphates and, in some cases, trialkyl phosphates. In this regard, reference is made to C. A. Hochwalt et al., Ind. Eng. Chem. 34, 20 (1942). Separation of pure monoalkyl phosphates from other alkyl phosphates may be accomplished only by tedious and expensive methods such as ion exchange, distribution between solvents of different polarity, or by selective precipitation as a salt. The choice of the method depends upon the size and nature of the alkyl group. Few methods have been reported for the direct preparation of "pure" monoalkyl phosphates and those which have been reported are highly involved and/or employ expensive intermediates. To illustrate, it has been found that diphenylalkyl phosphates may be converted to monoalkyl phosphates by catalytic hydrogenolysis in which the phenyl groups of the diphenylalkyl phosphates are replaced by hydrogen (E. A. Brown et al., J. Chem. Soc., 1955, 1584).

We have now discovered that "pure" monoalkyl phosphates in which the alkyl group contains 5 or more carbon atoms may be prepared directly according to the following general equation:

$$H_4P_2O_7 + ROH = RH_2PO_4 + H_3PO_4$$

wherein R represents an alkyl group, either branched or straight-chain, containing 5 or more carbon atoms. When the monoalkyl phosphate product is a liquid, the reaction may be accomplished satisfactorily without a solvent. However, in those instances where the product is a solid, it is generally very desirable to use an inert organic solvent such as benzene, ether, and the like to maintain the reaction mixture in a fluid state. The "pure" monoalkyl phosphates containing from 5 to about 8 carbon atoms are liquids, while those containing 10 or more carbon atoms are normally solids. For monoalkyl phosphates composed of various branched chains (e.g., those prepared from "oxo" alcohols), all containing a given number of carbon atoms, the isomeric distribution of the alkyl groups determines the melting point and, hence, the physical state. Accordingly, when preparing mono-n-heptyl phosphate or mono-2-ethylhexyl phosphate, both of which are liquids, no solvents will be necessary, while in preparing mono-n-decyl phosphate, mono-n-dodecyl phosphate, or mono-n-tetradecyl phosphate, all of which are white crystalline solids, it is highly preferable to use an inert solvent to dissolve the product.

The proportions of alcohol and pyrophosphoric acid which are reacted are not critical, although it is preferable to use stoichiometric quantities, or a slight excess (10–25%) of pyrophosphoric acid.

High reaction temperatures are generally unnecessary and deleterious. To illustrate, in the preparation of mono-2-ethylhexyl phosphate at 50° C. a pronounced discoloration plus a small degree of dehydration of the alcohol will normally be observed. At 90° C. alkene formations will be dominant. Furthermore, pyrophosphoric acid melts incongruently at 54° C. and thus any reactions accomplished at temperatures in excess thereof (where the pyrophosphoric acid is not first dissolved in an inert solvent) would be expected to yield a mixed reaction product. Melting of pyrophosphoric acid prior to dissolution on reaction would furnish both orthophosphoric acid and triphosphoric acid in the liquid phase. Some of the monoalkyl phosphates within the scope of the present invention may be prepared at very low temperatures, perhaps even as low as −50° C. to −100° C., although the use of such temperatures is somewhat impractical and without advantage. In some instances reaction may be carried out at temperatures as high as 75° C. without the appreciable formation of undesirable side products. This is especially true where the pyrophosphoric acid is first completely dissolved in an inert solvent before reaction with the alcohol. Nevertheless, the best mode presently contemplated for carrying out the process involves reacting the alcohol and pyrophosphoric acid at a temperature between about 0° C. and 50° C. Further, within this preferred range, room temperature appears to offer the greatest convenience and advantage.

Reaction is fairly slow, requiring about 24 to 36 hours to achieve 80% of completion at room temperature. The extent of conversion may be determined at any time during reaction by a titrimetric procedure described hereinafter. Since it is not practicable to await completion of the reaction, which probably follows second-order kinetics, it is desirable to separate the monoalkyl phosphate from unreacted alcohol and pyrophosphoric acid in addition to the co-product, orthophosphoric acid. For liquid monoalkyl phosphates, separation may be accomplished by dissolution of the reaction solution in benzene or the like, followed by removal of inorganic acids by multiple aqueous extractions and, finally, removal of the organic solvent and the excess alcohol by vacuum distillation. It is important to note that the monoalkyl phosphates in which the alkyl group contains 1 to 4 carbon atoms may not be easily separated by aqueous extractions and therefore this group of compounds is not within the scope of the present invention. The extent of the reaction may also be determined from the quantity of the alcohol recovered. For solid monoalkyl phosphates a different separation procedure is preferably followed. The procedure is essentially the same up to the step where vacuum distillation is used to separate unreacted alcohol from the product. The solid products are more easily separated (after removal of inorganic acids) by (a) adding water to the organic phase, (b) converting the water-insoluble monoalkyl phosphate to the water-soluble dialkali metal monoalkyl phosphate, (c) separating the organic and water phases (recovery of unreacted alcohol may be made from the organic phase), (d) treating the aqueous phase with HCl to convert the dialkali metal monoalkyl phosphate salt back to the monoalkyl phosphate, and (e) extracting the monoalkyl phosphate from the aqueous phase with an inert organic solvent. After the final extraction of the monoalkyl phosphate the solution may be washed again with dilute HCl and recrystallized from hexane to furnish a pure product.

The following table illustrates typical reaction rates obtained by the method of the present invention. The data of the table were obtained from the reaction of 2-ethylhexanol with pyrophosphoric acid followed by titration of samples removed from the liquid phase at the indicated time intervals. The reaction matrix was prepared from 32.5 grams (0.25 mole) of 2-ethylhexanol, 55.7 grams (0.313 mole) pyrophosphoric acid, and 100 grams of benzene. The total phosphorus was 10.3%.

*Table I*

| Reaction Time, Hours | Percent Phosphorus Liquid Phase | $\dfrac{\text{Moles RH}_2\text{PO}_4}{\text{Moles ROH} + \text{Moles RH}_2\text{PO}_4} \times 100$ |
| --- | --- | --- |
| 0.0 | | |
| 0.62 | 6.92 | |
| 2.66 | 8.43 | |
| 4.87 | 9.20 | 47.3 |
| 10.6 | 9.20 | 58.7 |
| 22.8 | 9.06 | 79.9 |
| 49.2 | 9.23 | 82.0 |
| 70.5 | 9.11 | 83.5 |
| 93.5 | 9.28 | 87.0 |

The speeds of decanol and dodecanol reactions with pyrophosphoric acid were practically the same as the 2-ethylhexanol reaction. Extending the reaction time beyond about 24 hours did not materially increase product yield.

In a preferred process, the first water extraction of the reaction mixture is accomplished at elevated temperatures, preferably only slightly below the boiling point of the lowest boiling component of the mixture (usually the organic solvent). Accordingly, where ether is used as the solvent, the extraction temperature is limited to about 40° C., whereas benzene allows temperatures as high as 70° C. While it is not intended that the invention should be limited by any theory expressed herein, the water extraction at elevated temperatures appears to cause hydrolysis of any monoalkyl pyrophosphate formed by the reaction converting the same to monoalkyl phosphate and orthophosphoric acid. Consequently, somewhat better yields of pure monoalkyl phosphates are to be expected when the first water extraction is accomplished at elevated temperatures. In practice, it has been found that the yield may be improved as much as about 3–10% by this procedure.

In the preferred process for separating the solid monoalkyl phosphate (after extraction of the inorganic acids), the water soluble monoalkyl disodium phosphate is prepared by reacting sodium hydroxide with the monoalkyl phosphate (in the presence of sufficient water to solublize the disodium salts) until the aqueous solution has a pH of about 12 or higher, indicating the completion of the reaction. The pH of the aqueous phase (after separation from the organic phase containing the solvent and alcohol) may then be adjusted to about 0.5 with hydrochloric acid. During this acidification, the precipitation and dissolution of both the monosodium salt, $RNaHPO_4$, and the so-called hemi-sodium salt, $RNaHPO_4 \cdot RH_2PO_4$ (both water-insoluble) may be observed. At pH 0.5, the pure monoalkyl dihydrogen phosphate may be recovered by extraction with ether. For all extraction operations ether is preferred over benzene since monoalkyl phosphates show a lesser tendency toward emulsification in the former.

From the above description of our process, it will be obvious to those skilled in the art that the alkali metal salts of the monoalkyl phosphates are easily prepared by only slight modifications of the general processing scheme. Thus, after the reaction has proceeded to the point desired (usually 70–90% complete) the phosphoric acids may be extracted with water, and sufficient alkali metal base added to the monoalkyl phosphate (even while unreacted alcohol and/or solvent are still present) to react therewith, forming the desired salt. Depending upon the solubility characteristics of the resulting monoalkyl phosphate salt, recovery may be accomplished by evaporating off any solvent, filtering the precipitated crystals and/or extracting with a solvent. In preparing the monoalkali metal salts or the hemi-alkali metal salts generally higher purity may be attained if the dialkali metal salt is first prepared and then neutralized with an acid, e.g., HCl, to the pH of the desired compound. Precipitation of the water-insoluble monoalkali metal monoalkyl phosphates will usually begin as the pH is lowered (starting at about 12 for the dialkali metal salt) to about 8 and will continue to a pH of about 5, at which point the hemi-salts begin to form. There is no clear-cut dividing line between the formation of the two salts and therefore an intermediate pH (e.g., about 6) will normally be most effective for precipitating the mono-salts where high purity is desired. The precipitation of the hemi-salts appears to be complete at a pH of about 3, at which point the monoalkyl dihydrogen phosphate begins to form. Accordingly, an intermediate pH of about 4 is preferred for preparing pure hemi-salts.

The water and solvent extractions of the invention have proven to be highly effective for isolating the monoalkyl phosphates and their alkali metal salts. In any event, all solid monoalkyl phosphates may be purified by recrystallization. Impurities may be effectively removed by one crystallization from hexane. The purity of recrystallized monoalkyl phosphates has been conclusively demonstrated by means of paper chromatography, titration, and the attainment of a sharp melting point.

The following specific examples will serve to illustrate the process of the present invention, but should not otherwise be construed as limiting the scope thereof.

*Example 1.—Mono-n-Heptyl Phosphate*

Pyrophosphoric acid (193 grams) and n-heptyl alcohol (112 grams) were added to a 500 ml. flask equipped with a drying tube, stirrer, and thermometer. After stirring for one day at about 30° C., the flask was allowed to stand for four additional days at room temperature. A gradual discoloration or darkening occurred as the reaction proceeded. A portion of the viscous liquid (77.4 grams) was dissolved in 200 ml. of ether and the ether solution was thrice extracted with 100 ml. portions of distilled water. The ether-rich layer was then drained into an evaporating dish. The residue obtained weighed 42.0 grams, and was subjected to vacuum distillation at 2 mm. Hg pressure (a vapor temperature of 48–50° C.). The temperature of the liquid phases was 115–125° C. Removal of 2.0 grams n-hepytl alcohol gave 40.0 grams of mono-n-heptyl phosphate, a thick, oily liquid. The yield was 90% of theoretical. The analysis showed 15.9% P compared to the calculated value for mono-n-heptyl phosphate of 15.8% P.

*Example 2.—Mono-2-Ethylhexyl Phosphate*

Pyrophosphoric acid (196 grams) and 2-ethylhexanol (143 grams) were added to a 500 ml. flask. Stirring was continued for one day and the flask was allowed to stand for several additional days. A portion of the darkened viscous liquid (104 grams) was dissolved in 150 ml. of benzene. After three water extractions of 100 ml. each, the benzene-rich layer was transferred to a vacuum distillation assembly. Benzene and a small volume of water were stripped off at room temperature. The temperature was then slowly increased and a few ml. of 2-ethylhexanol collected at a vapor temperature of 55–57° C. and a liquid temperature of 120–130° C. (at a pressure of 2.5 mm. Hg). The product, a thick, oily liquid, weighed 54.2 grams. This yield was 93% of theoretical based upon the starting amount of alcohol. The analysis of the product showed 14.3% P, compared to the calculated value for mono-2-ethylhexyl phosphate of 14.7% P.

Example 3.—Mono-n-Decyl Phosphate

Pyrophosphoric acid (111 grams), n-decyl alcohol (79.0 grams) and benzene (100 grams) were added to a 500 ml. flask. After stirring for several days, 138 grams of the viscous liquid produced was dissolved in 300 ml. of ether. The ether solution was extracted once with 200 ml. of water. The ether-rich layer was then added dropwise with stirring to a solution prepared from 500 ml. water and 60 grams of 50% NaOH. During the addition, 100 ml. of ether was also added to reduce viscosity. From the resulting ether-rich layer, 4.0 grams of n-decanol was recovered. The pH of the aqueous layer was then adjusted from an initial value of 12.4 to a final value of 0.5 with 1:3 HCl under constant stirring. During the acidification, the formation and dissolution of both $C_{10}H_{21}NaHPO_4$ and $C_{10}H_{21}NaHPO_4 \cdot C_{10}H_{21}H_2PO_4$ were observed. At pH 0.5, 300 ml. of ether was added with the formation of two liquid phases. The aqueous phase was discarded. The ether-rich phase was washed with 1 N HCl and transferred to an evaporating dish. After evaporation of the ether, the product was vacuum desiccated over sulfuric acid. The crude product weighed 48.1 grams, 94% of the theoretical yield, based upon the amount of alcohol consumed. Recrystallization from hexane gave a white crystalline product. The analysis showed 12.9% P, compared to 13.0% P, theoretical, for mono-n-decyl phosphate. The melting point of the product was 45° C.

Example 4.—Mono-n-Dodecyl Phosphate

Pyrophosphoric acid (152 grams), n-dodecyl alcohol (131 grams), and benzene (100 ml.) were added to a 500 ml. flask. After stirring for one day, the flask was allowed to stand an additional four days at room temperature. Thereafter, 124 grams of the liquid was removed and dissolved in 400 ml. of ether. After one water extraction (200 ml. $H_2O$), the ether-rich layer was added to 400 ml. of water. With constant stirring, 50% NaOH was added until the pH of the aqueous layer reached 12.0. The fairly viscous liquid was then transferred to a separatory funnel and allowed to stand for several hours until separation of the layers occurred. From the ether layer 5.8 grams of n-dodecyl alcohol was recovered. The pH of the aqueous layer was adjusted to 0.5 by the addition of 1:3 HCl, with stirring. At this point, the addition of 250 ml. of ether and 100 ml. of 1:3 HCl was necessary for the dissolution of a heavy white precipitate ($C_{12}H_{25}NaHPO_4 \cdot C_{12}H_{25}H_2PO_4$), with the formation of two clear liquid layers. The aqueous layer was discharded. The ether-rich layer was washed with dilute HCl and drained into an evaporating dish. The crude mono-n-dodecyl phosphate was vacuum desiccated over sulfuric acid. A yield of 53.4 grams was obtained, essentially 100% of the theoretical yield based upon the amount of alcohol consumed. Titration indicated the absence of both di-n-dodecyl phosphate and orthophosphoric acid. The product was recrystallized from hexane and found to have an analysis of 11.6% P, compared to 11.65% P, the theoretically predicted value for mono-n-dodecyl phosphate.

Example 5.—Mono-n-Tetradecyl Phosphate

Pyrophosphoric acid (55.6 grams), n-tetradecyl alcohol (53.5 grams), and benzene (50 grams) were added to a 250 ml. flask. After stirring for two days, 70.7 grams of the resulting liquid were removed and dissolved in 200 ml. of ether. The ether solution was shaken once with 100 ml. of distilled water to extract the inorganic acids. The ether-rich layer was separated and added slowly to a solution prepared from 30 grams of 50% NaOH and 250 ml. of water. A white precipitate formed and persisted throughout the addition. One liter of water and 100 ml. of ether were then added prior to shaking in a separatory funnel. The clear aqueous layer was retained. The ether-rich layer containing some gelatinous solids was added to 500 ml. of water and 5 grams of 50% NaOH and the mixture shaken in a separatory funnel. After standing for several hours, two clear liquid layers formed. Unreacted n-tetradeconal (3.8 grams) was recovered from the ether layer. The two aqueous layers were combined and adjusted to a pH of 0.7 wtih 1:3 HCl plus a little concentrated HCl. Addition of 500 ml. of ether at this pH gave two clear liquid layers. The aqueous phase was discarded. The ether-rich phase was washed with dilute HCl and transferred to an evaporating dish. After evaporation of the ether and vacuum desiccation over sulfuric acid, a crude product weighing 25.0 grams remained, corresponding to a yield of 92% of the theoretically predicted value. The product was purified by recrystallization from hexane to furnish a solid which analyzed as 10.8% P, compared to the calculated value for mono-n-tetra-decyl phosphate of 10.5% P. The product had a melting point of 68° C.

Example 6.—Mono-Eicosyl Phosphate

To a 500 ml. three-necked flask were added 149 grams of eicosyl alcohol, 11 grams pyrophosphoric acid, and 100 grams of benzene. After stirring for several days at room temperature, 132 grams of the liquid was dissolved in 300 ml. of ether. The ether solution was shaken with 200 ml. of water to remove inorganic acids. The ether-rich phase was added slowly with stirring to a solution prepared from 400 ml. of water and 60 grams of 50% NaOH. A clear lower aqueous layer was drained off leaving a white solid suspended in the ether-rich layer. The solid was separated from the ether layer in a centrifuge and combined with the aqueous layer. From the ether layer 17.6 grams of eicosyl alcohol was recovered. The combined aqueous layer and white solid were treated with 1:3 HCl until the pH of 0.5 was attained. At this point, 100 ml. of ether was added forming two clear layers. The aqueous layer was discarded and the ether layer washed with 1 N HCl. After evaporation of ether, 61.2 grams of product was obtained as a yellow, viscous liquid, having an index of refraction $N_D^{25} = 1.4514$.

All of the alcohols used in the above examples were commerciadlly available straight-chain or branched alcohols. The pyrophosphoric acid used contained less than 2% of other phosphoric acids, mainly present as orthophosphoric acid and triphosphoric acid. The benzene used as a solvent was distilled from phosphorus pentoxide.

During the above experiments, the extent of reaction was determined by means of a titrimetric procedure for the determination of orthophosphoric acid in the presence of alkyl orthophosphates and alkyl pyrophosphates. This procedure comprised the following steps: A sample of the liquid phase was withdrawn and dissolved in 75% acetone-25% water, by volume. Occasionally it was necessary to add a little more water as the titration proceeded in order to prevent turbidity. A titration with 0.1 N NaOH to the first end-point "A" at pH 5 to 7.0 gave the total phosphorus. A second end-point "B" was reached at pH 9.5 to 11.5. When end-point "B" had been passed, 25 ml. of 10% $BaCl_2$ solution were added, releasing the third hydrogen of orthophosphoric acid. The pH was then adjusted to about 11.5 with excess 0.1 N NaOH and back titration with 0.1 N HCl through a strong hydrogen end-point at pH 8 to 11 gave the third end-point "C." The number of equivalents of base used beyond end-point "B" minus the number of equivalents of acids used to reach endpoint "C" gave the orthophosphoric acid content. Thus, the method allowed for the determination of orthophosphoric acid and total phosphorus with reasonably high accuracy. It did not include determination of pyrophosphoric acid and monoalkyl phosphates although their sum could be obtained by difference.

Both crude and recrystallized products were analyzed by the titration procedure described above for total phosphorus and orthophosphoric acid. The results obtained were confirmed qualitatively by means of a paper chromatographic method performed essentially as described by C. S. Hanes et al., in an article appearing in Nature, 164, 1107 (1949). Resolution of orthophosphoric acid, pyrophosphoric acid, and monoalkyl phosphate was possible using as a chromatographic solvent a solution containing 60% acetone, 35% water, and 5% concentrated ammonia, by volume.

The monoalkyl phosphates and alkali metal salts thereof of the present invention are all well-known compounds having their principal utility as lube oil additives, metal extractants, detergent ingredients, and metal treating agents. To illustrate the utility of the pure monoalkyl phosphates, the mono-2-ethylhexyl phosphate has been found to have selective extraction behavior in the separation of neptunium from other actinides as formed in nuclear reactors. In this regard, reference is made to U.S. Patent 3,004,823. Other uses for the compounds of the invention in their pure form are well-known in the prior art.

The foregoing description is given for clearness of understanding only and no unnecessary limitations should be understood therefrom, as modifications will be obvious to those skilled in the art.

We claim:

1. A process for preparing and isolating a substantially water-insoluble monoalkyl phosphate which comprises reacting pyrophosphoric acid with about a stoichiometric proportion of a primary aliphatic alcohol of chain length sufficient to yield said water-insoluble monoalkyl phosphate, said reaction being accomplished at a temperature not greater than 75° C. and until such second-order reaction is approximately 70% to 90% complete, extracting the inorganic acids from the reaction mixture with water, and recovering the monoalkyl phosphate from the water-insoluble residue.

2. The process of claim 1 wherein the substantially water-insoluble monoalkyl phosphate is a solid and the reaction is carried out in the presence of an inert organic solvent.

3. The process of claim 1 wherein the extraction of the inorganic acids from the reaction mixture is accomplished with hot water at a temperature only slightly below the boiling point of the lowest boiling component of the reaction mixture.

4. A process for preparing and isolating a substantially water-insoluble monoalkyl phosphate which comprises reacting pyrophosphoric acid with about a stoichiometric proportion of a primary aliphatic alcohol of chain length sufficient to yield said water-insoluble monoalkyl phosphate, said reaction being accomplished at a temperature not greater than 75° C. to yield a crude reaction mixture, extracting the inorganic acids from the reaction mixture with water, adding aqueous sodium hydroxide to the organic phase in sufficient proportion to convert all of the water-insoluble monoalkyl phosphate to a water-soluble monoalkyl disodium phosphate, separating the aqueous phase containing the monoalkyl disodium phosphate from the organic phase containing the unreacted aliphatic alcohol, treating the aqueous phase with HCl to convert the monoalkyl disodium phosphate salt back to the monoalkyl phosphate, and recovering the monoalkyl phosphate from the aqueous phase.

5. The process of claim 4 wherein the substantially water-insoluble monoalkyl phosphate is a solid and the reaction is carried out in the presence of an inert organic solvent.

6. The process of claim 4 wherein the extraction of the inorganic acids from the reaction mixture is accomplished with hot water at a temperature only slightly below the boiling point of the lowest boiling component of the reaction mixture.

References Cited in the file of this patent

UNITED STATES PATENTS

| | | |
|---|---|---|
| 2,339,038 | Tulleners | Jan. 11, 1944 |
| 2,084,361 | Vanderbilt | June 22, 1957 |
| 2,818,420 | De Jonge | Dec. 31, 1957 |

OTHER REFERENCES

Ballou et al.: "J. Am. Chem. Soc.," vol 77, pp. 5967–5970 (1955).